US011659843B2

(12) United States Patent
Andre-Bartley et al.

(10) Patent No.: US 11,659,843 B2
(45) Date of Patent: May 30, 2023

(54) FOOD SMOKING SKEWER

(71) Applicants: Fabrice Marcy Andre-Bartley, West Palm Beach, FL (US); Alfred Aubre Bartley, West Palm Beach, FL (US)

(72) Inventors: Fabrice Marcy Andre-Bartley, West Palm Beach, FL (US); Alfred Aubre Bartley, West Palm Beach, FL (US)

( * ) Notice: Subject to any disclaimer, the term of this patent is extended or adjusted under 35 U.S.C. 154(b) by 133 days.

(21) Appl. No.: 16/949,673

(22) Filed: Nov. 10, 2020

(65) Prior Publication Data
US 2021/0137129 A1 May 13, 2021

Related U.S. Application Data

(60) Provisional application No. 62/934,105, filed on Nov. 12, 2019.

(51) Int. Cl.
*A23B 4/00* (2006.01)
*A23L 5/10* (2016.01)
*A47J 43/10* (2006.01)
*A23B 4/052* (2006.01)
*A47J 43/18* (2006.01)

(52) U.S. Cl.
CPC .............. *A23B 4/052* (2013.01); *A23L 5/10* (2016.08); *A47J 43/18* (2013.01); *A23V 2002/00* (2013.01)

(58) Field of Classification Search
CPC ..... A23B 4/052; A23B 4/0523; A23B 4/0526; A47J 43/18; A23L 5/10
See application file for complete search history.

(56) References Cited

U.S. PATENT DOCUMENTS

| 1,485,253 | A | * | 2/1924 | Devlin | A47J 37/00 165/47 |
| 2,350,623 | A | | 6/1944 | Kruea | |
| 4,724,753 | A | * | 2/1988 | Neyman | A47J 37/0763 126/30 |
| 4,779,525 | A | * | 10/1988 | Gaines | A23B 4/0523 206/525 |
| 5,193,445 | A | * | 3/1993 | Ferguson | A23B 4/044 206/524.6 |
| 5,922,377 | A | * | 7/1999 | Nordstrom | A23L 13/70 426/523 |
| 6,062,131 | A | | 5/2000 | Holland | |
| 6,502,501 | B1 | * | 1/2003 | Simon | A47J 27/04 99/347 |

(Continued)

*Primary Examiner* — Ericson M Lachica
(74) *Attorney, Agent, or Firm* — Dunlap Bennett & Ludwig PLLC; Anna L. Kinney

(57) ABSTRACT

A smoking skewer for imparting a smoke flavoring to an interior of a food item is disclosed. The smoking skewer includes an elongate hollow rod, a food penetrating point at the distal end and a handle is at the proximal end. An opening is also provided at the proximal end of the elongate hollow rod. A plurality of apertures are disposed in a spaced apart relation along the elongate hollow rod are dimensioned to convey a smoke source from the interior cavity to the exterior surface of the elongate hollow rod and the interior of a food item carried thereon. A mesh sleeve is carried within the interior cavity to contain ash and particulates from the smoke source. The smoke source may be a smoking stick, formed of a combustible material to generate a smoke flavoring combustion by product.

4 Claims, 4 Drawing Sheets

(56) References Cited

U.S. PATENT DOCUMENTS

| | | | |
|---|---|---|---|
| 6,582,741 B2* | 6/2003 | Haig | A21C 15/007 |
| | | | 99/533 |
| 6,779,438 B1 | 8/2004 | Citrynell et al. | |
| 8,813,636 B2 | 8/2014 | Oswald | |
| 9,839,224 B2 | 12/2017 | Patton | |
| 10,010,215 B2 | 7/2018 | Brown | |
| 10,299,621 B1* | 5/2019 | Bourgeois | A47J 27/04 |
| 2006/0068067 A1* | 3/2006 | Zimmerman | A23L 5/12 |
| | | | 426/281 |
| 2011/0226135 A1* | 9/2011 | Oswald | A47J 27/04 |
| | | | 99/473 |
| 2014/0261015 A1* | 9/2014 | Nelson | A23B 4/052 |
| | | | 99/467 |
| 2014/0299005 A1* | 10/2014 | Vinett | A23B 4/052 |
| | | | 99/482 |
| 2015/0079251 A1* | 3/2015 | Parrish | A47J 37/049 |
| | | | 426/314 |
| 2017/0238566 A1* | 8/2017 | Smith | A23B 4/0523 |
| 2018/0139974 A1* | 5/2018 | Flood | A23B 4/052 |

* cited by examiner

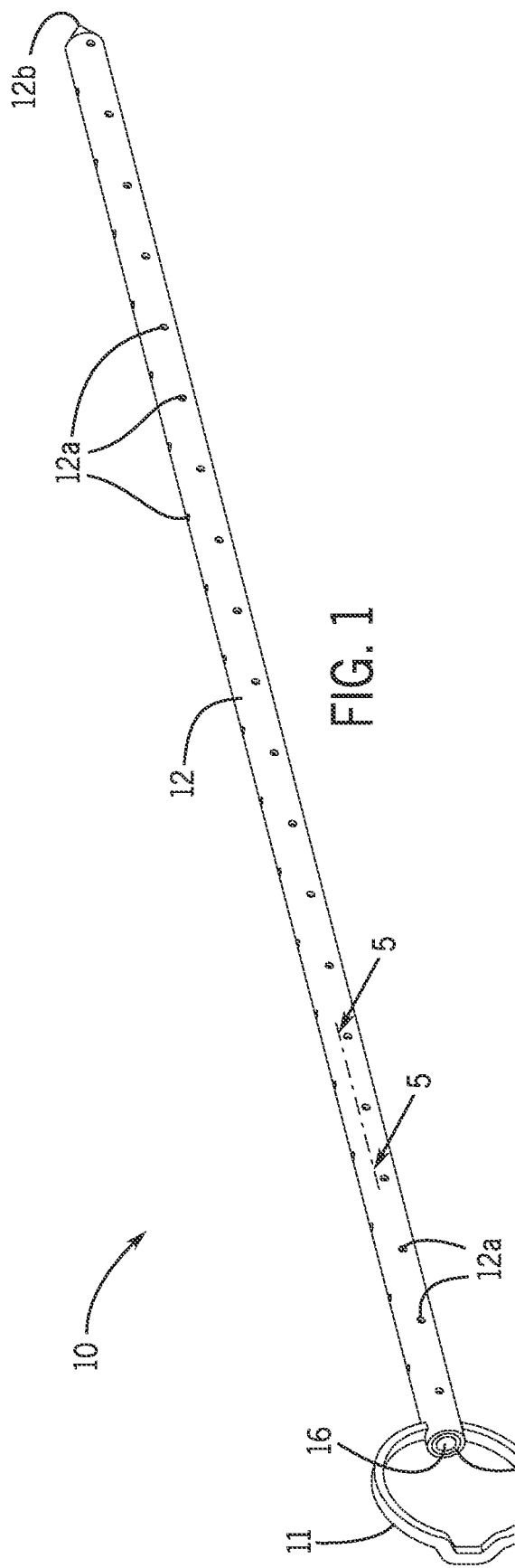
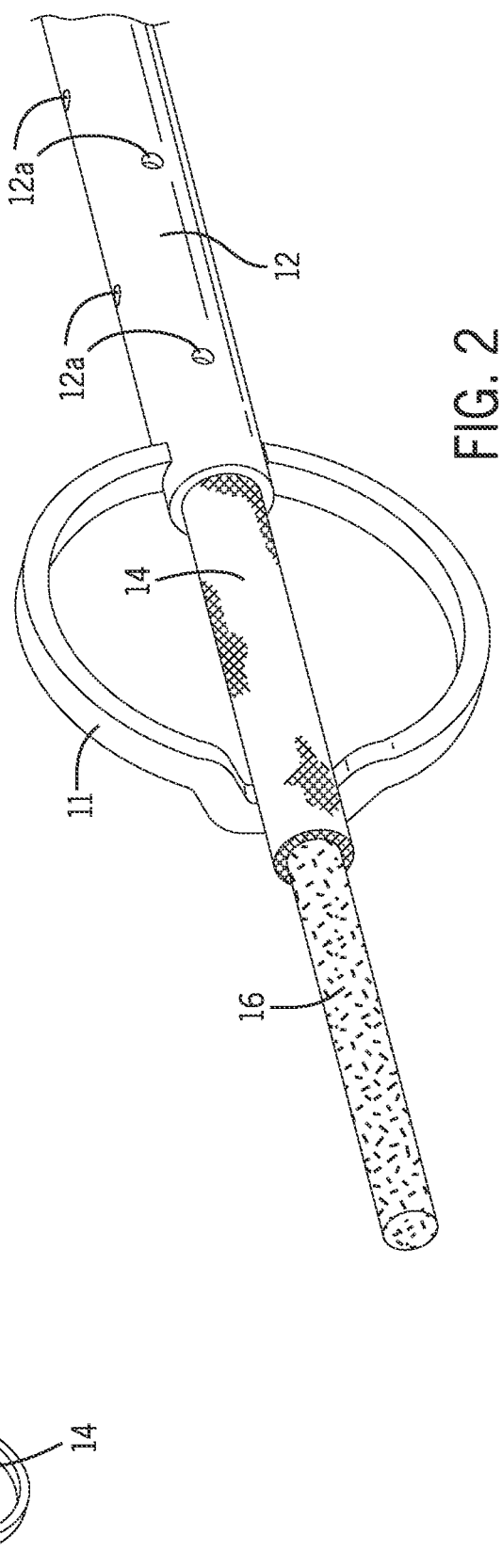
FIG. 1
FIG. 2

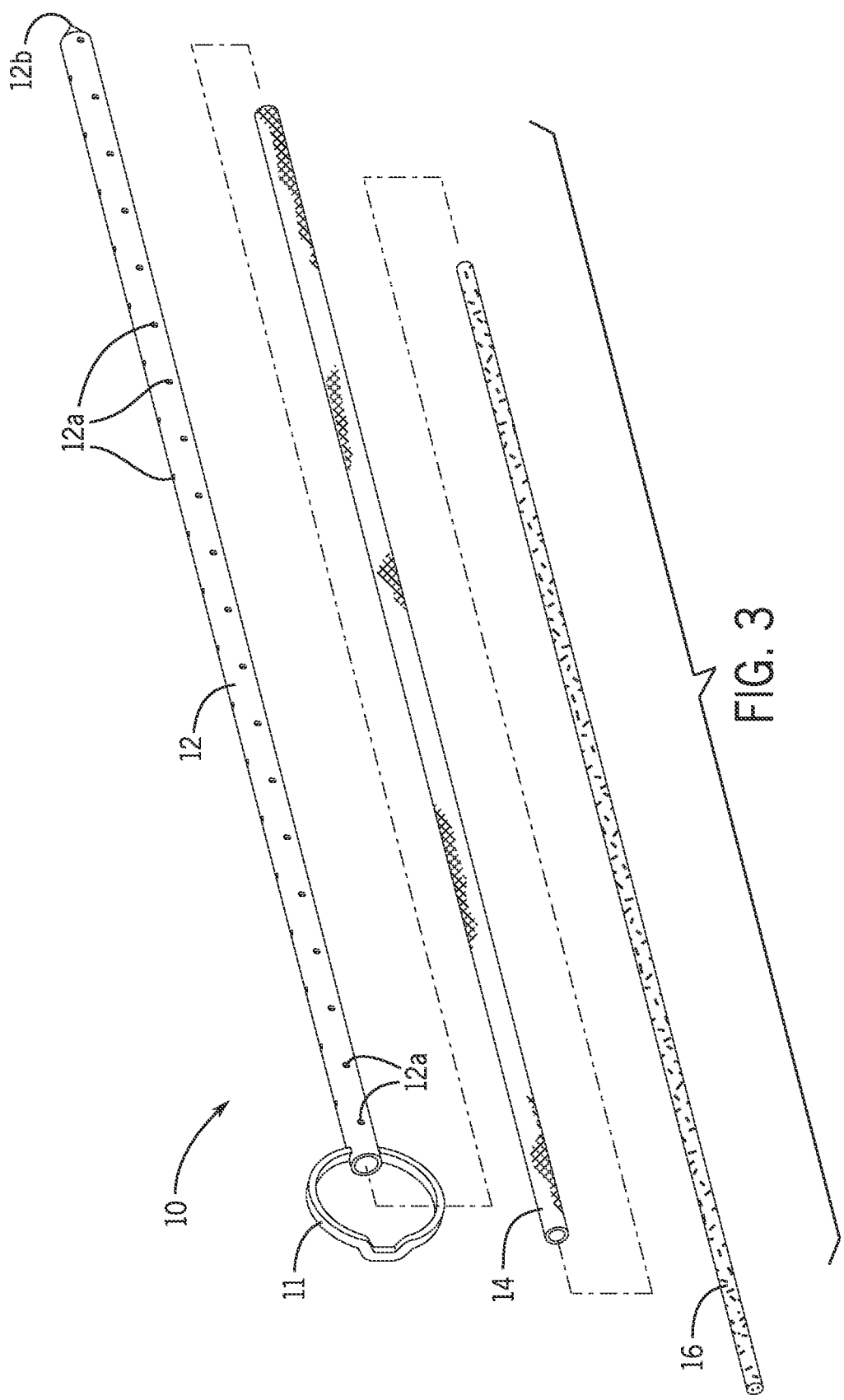

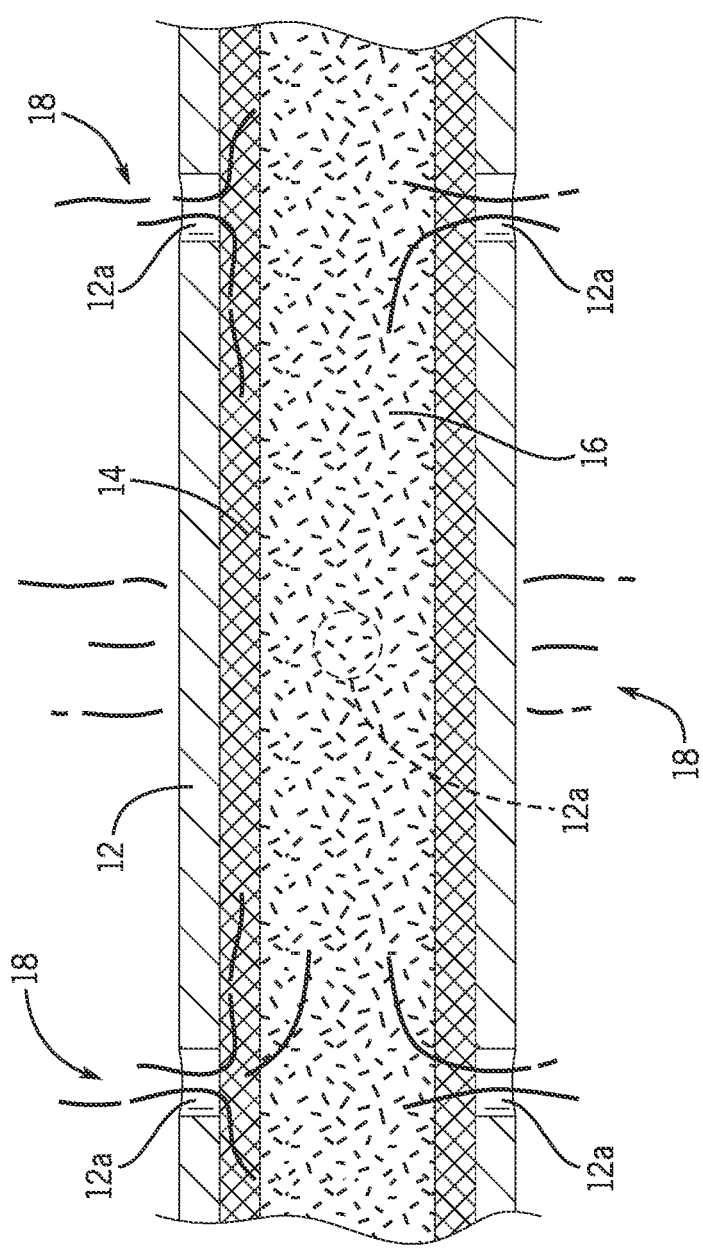
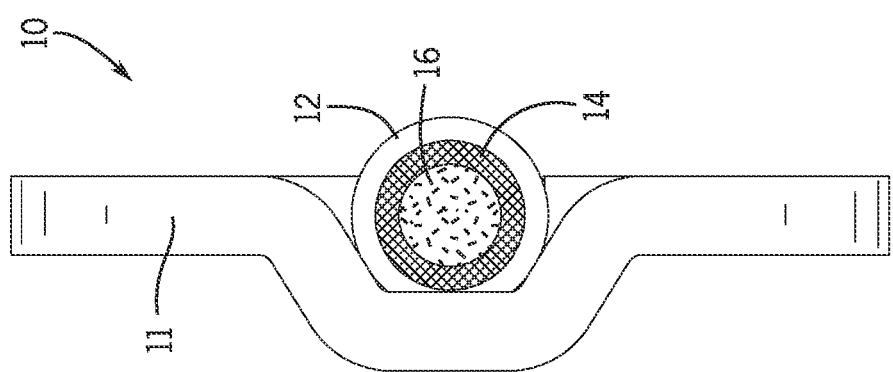
FIG. 5
FIG. 4

FOOD SMOKING SKEWER

CROSS-REFERENCE TO RELATED APPLICATION

This application claims the benefit of priority of U.S. provisional application No. 62/934,105, filed Nov. 12, 2019, the contents of which are herein incorporated by reference.

BACKGROUND OF THE INVENTION

The present invention relates to food preparation items, and more particularly to food preparation items for smoking foods.

Many people like food items prepared by smoking. However, with conventional food smoking methods it is not easy to smoke foods safely indoors. Accordingly, most people utilize an outdoor BBQ smoker. When using an outdoor BBQ smoker smoking foods is a long process and the smoking flavor is only on the outside layers of the food.

For smaller items, such as shrimp, cut pieces of meat, vegetables, or other food items, grilling and smoking is accomplished with wooden or metal skewers that carry the food items for grilling and smoking. Again, conventional skewers are only able to impart smoking flavors to the outside layers of the food items.

As can be seen, there is a need for an improved skewer that allows the user to impart smoke flavoring to the interior of the food item and allow the user to smoke such items safely in an indoor environment.

SUMMARY OF THE INVENTION

In one aspect of the present invention, a smoking skewer for imparting a smoke flavoring to a food item is disclosed. The smoking skewer includes an elongate hollow rod having a proximal end, a distal end, and an interior cavity. A plurality of apertures is disposed in a spaced apart relation along a longitudinal length of the elongate hollow rod. The plurality of apertures extends between the interior cavity and an outer surface of the elongate hollow rod. A food penetrating tip is defined at the distal end. An opening to the interior cavity defined at the proximal end. A wire mesh sleeve is dimensioned to be received within the interior cavity. The wire mesh sleeve defining an inner space therein. The wire mesh sleeve having a plurality of pores dimensioned to contain one or more of an ash and a particulate from a smoking source from entering the plurality of apertures while permitting passage of a smoke produced by the smoking source.

In some embodiments, a handle is provided at the proximal end of the elongate hollow rod.

In some embodiments, a smoking stick is dimensioned to be received within the inner space of the wire mesh sleeve. The smoking stick is formed of a combustible material selected from the group consisting of a granularized and packed wood particles and a charcoal.

In some embodiments, the wire mesh sleeve is removable from the interior cavity.

In some embodiments, the handle retains the wire mesh sleeve within the interior cavity.

In other embodiments, the plurality of apertures extend beyond a food carriage area of the elongate hollow rod to provide a path for a combustion air source for the smoking stick.

In other aspects of the invention, a method of imparting a smoke flavoring to an interior of a food item is disclosed. The method includes providing a smoking skewer having an elongate hollow rod with a proximal end, a distal end, an interior cavity. A plurality of apertures are disposed in a spaced apart relation along a longitudinal length of the elongate hollow rod. The plurality of apertures extend between the interior cavity and an outer surface of the elongate hollow rod. A food penetrating tip is defined at the distal end and an opening to the interior cavity is defined at the proximal end. A wire mesh sleeve is dimensioned to be received within the interior cavity. The method also includes applying one or more food items to the smoking skewer.

In some embodiments, the method includes applying a smoke source to the interior cavity, with the smoke source emanating through the plurality of apertures to the interior of the food item.

In some embodiments, the method includes inserting an elongate smoking stick in the interior cavity. The elongate smoking stick is formed of a smoke generating combustible material. The elongate smoking stick is ignited to cause a combustion of the elongate smoking stick.

In other embodiments, the smoke generating combustible material is selected from the group consisting of granularized and packed wood particles and charcoal.

These and other features, aspects and advantages of the present invention will become better understood with reference to the following drawings, description and claims.

BRIEF DESCRIPTION OF THE DRAWINGS

FIG. 1 is a perspective view of a food smoker skewer.

FIG. 2 is a partially exploded perspective view of a detail of the food smoker skewer.

FIG. 3 is an exploded perspective view of the food smoker skewer.

FIG. 4 is an end view of the food smoker skewer.

FIG. 5 is a detail cross-sectional view indicated by line 5-5 of FIG. 1.

DETAILED DESCRIPTION

Figure 6:
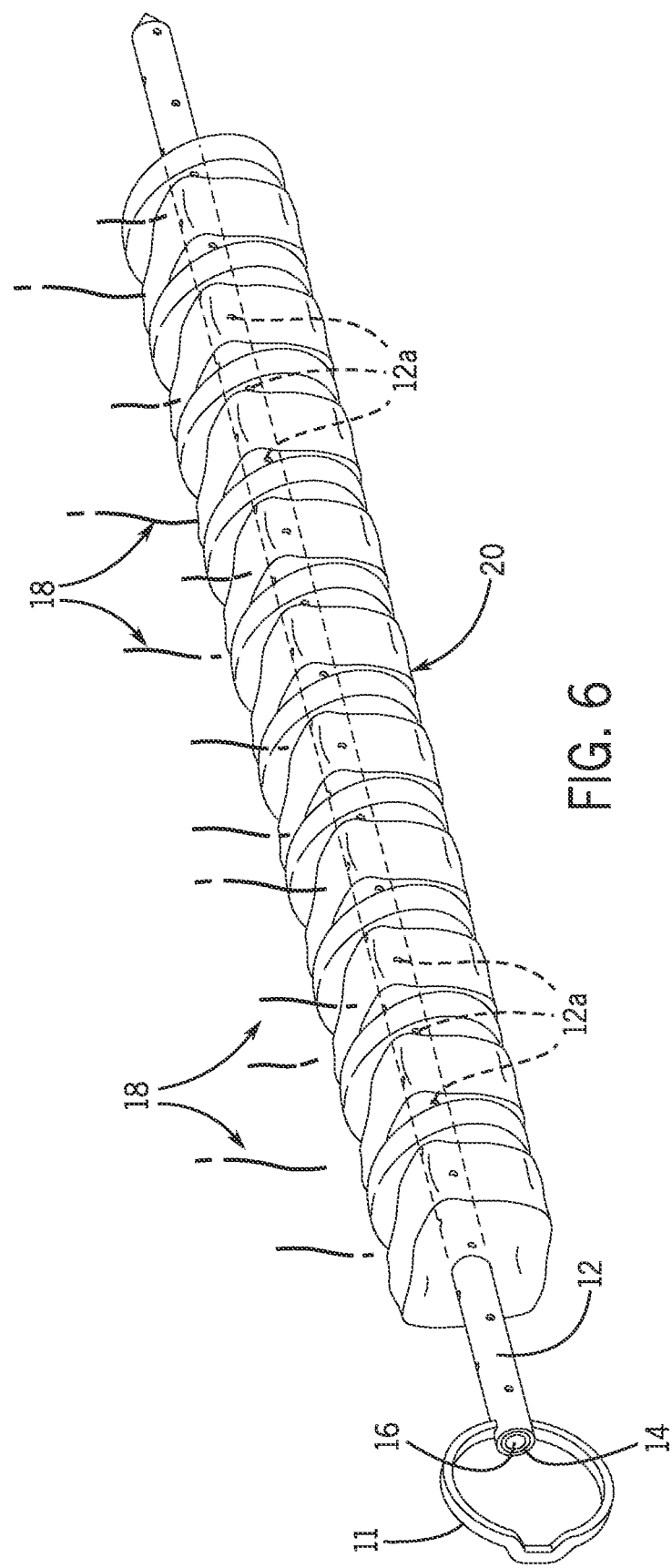
FIG. 6 is a perspective view of the food smoker skewer shown in use.

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provides a smoking skewer for smoking food items. As seen in reference to the drawings of FIGS. 1-6, a food smoking skewer 10 according to aspects of the present invention includes an elongate hollow rod 12 having a proximal end, a distal end, and an interior cavity. A food penetrating point 12b is provided at the distal end and a handle 11 is provided at the proximal end. An opening is also provided at the proximal end of the elongate hollow rod 12. A plurality of apertures 12a are disposed in a spaced apart relation along and around a peripheral surface of the elongate hollow rod 12. The plurality of apertures 12a extend between the interior cavity and an exterior surface of the elongate hollow rod 12. The plurality of apertures 12a are dimensioned to convey a smoke source from the interior cavity to the exterior surface of the elongate hollow rod 12.

A removable mesh sleeve 14 is dimensioned to be received within the interior cavity of the elongate hollow rod 12. An inner chamber is defined on an inner space within the removable mesh sleeve 14. A plurality of pores in the removable mesh sleeve 14 are dimensioned to contain ash and particulates from the smoke source from entering the plurality of apertures 12a while permitting passage of a smoke produced by the smoking source.

In a preferred embodiment, the smoke source includes an elongate smoking stick 16 that is dimensioned to be received within the inner space of the mesh sleeve 14. The smoking stick 16 is formed of a combustible material selected from the group consisting of granularized and packed wood particles and charcoals. The smoking stick 16 may be one of a hardwood smoke flavoring or other desired smoke flavoring for a food item. Those of skill in the art will appreciate that the smoke flavorings may include hickory, mesquite, apple, cherry, cedar, and other desirable smoke flavorings left to the creativity of the grill meister chef and the and palate of the smoked food item 20 consumer. The smoke source may also include a smoke conveyed through the proximal end of the food smoking skewer 10.

The handle 11 may be configured to retain the smoke stick 16 and the mesh sleeve 14 within the interior cavity of the smoking skewer 10.

In use, a plurality of food items 20 are placed on the food smoking skewer 10 by penetrating the food item 20 with the food penetrating tip 12b in much the same way as a kabob for conventional grilling. With the mesh sleeve 14 and the smoking stick 16 carried within the food smoking skewer 10, the smoking stick 16 is ignited to begin combustion of the smoking stick 16. As the smoking stick 16 burns within the food smoking skewer 10, the smoke emitted by the smoking stick 16 penetrates the plurality of food items 20 to impart the smoke flavor to an interior of the food item 20.

Combustion of the smoking stick 16 may also at least partially cook the food item 20 from within, with the extent of cooking dependent upon the thermal capacity of the smoking stick 16 which may be adjusted by a diameter of the elongate hollow rod 12, a diameter of the smoking stick 16 and a thermal capacity of the combustible materials contained within the smoking stick 16. The plurality of apertures 12 may extend beyond a food carriage area of the smoking skewer 10 to provide a path for a combustion air source for the smoking stick 16.

If needed, an exterior of the food item 20 may be cooked by conventional methods, such as grilling, pan searing, broiling, or roasting. In an indoor environment, smoke emitted by the smoking skewer 10 is confined to the cook surface area and may be ventilated from the cooking area by a conventional vent fan of the cook surface. When the food item 20 has been prepared, it may be removed from the food smoking skewer 10 and plated for the consumer of the food item 10. For a more unique plating of the food item 20, the food items 20 may be plated on a still smoking food smoking skewer 10.

The food smoking skewer 10 may be reused by simply removing the remnants of the food smoking stick 16 and the mesh sleeve 14. The food smoking skewer 10 and the mesh sleeve 14 may be cleaned for the next use. The remnants of the food smoking stick 16 may be discarded, taking care to ensure that any remaining embers are extinguished.

It should be understood, of course, that the foregoing relates to exemplary embodiments of the invention and that modifications may be made without departing from the spirit and scope of the invention as set forth in the following claims.

What is claimed is:

1. A method of imparting a smoke flavoring to an interior of one or more food items, the method comprising:
providing a smoking skewer having an elongate hollow rod with a proximal end, a distal end, an interior cavity, and a plurality of apertures disposed in a spaced apart relation along a longitudinal length of the elongate hollow rod, the plurality of apertures extending between the interior cavity and an outer surface of the elongate hollow rod, a food penetrating tip defined at the distal end, and an opening to the interior cavity defined at the proximal end, and a wire mesh sleeve dimensioned to be received within the interior cavity; and
applying the one or more food items to the smoking skewer by penetrating the one or more food items with the food penetrating tip of the smoking skewer such that the smoking skewer is surrounded by the one or more food items.

2. The method of claim 1, further comprising:
applying a smoke source to the interior cavity, the smoke source emanating through the plurality of apertures to the interior of the one or more food items having been penetrated by the smoking skewer.

3. The method of claim 2, further comprising
inserting an elongate smoking stick in the interior cavity, the elongate smoking stick formed of a smoke generating combustible material; and
igniting the elongate smoking stick to cause a combustion of the elongate smoking stick.

4. The method of claim 3, wherein the smoke generating combustible material is selected from the group consisting of granularized and packed wood particles and charcoal.

* * * * *